Feb. 23, 1965   R. J. GRUENSTEIN   3,170,418
DISPLAY APPARATUS AND SYSTEM
Filed Aug. 9, 1963   4 Sheets-Sheet 1

INVENTOR.
Rolf J. Gruenstein
BY
Attorneys

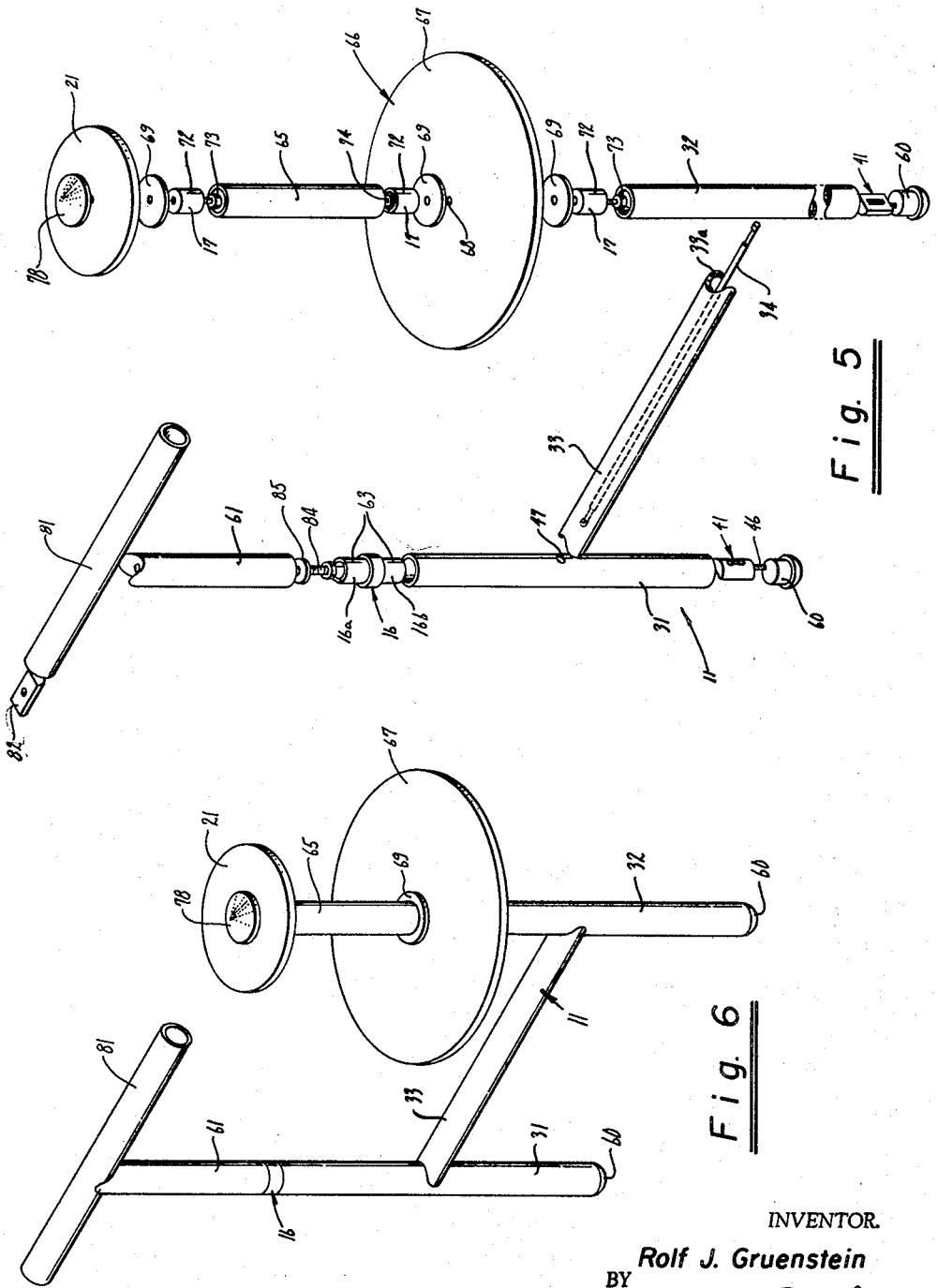

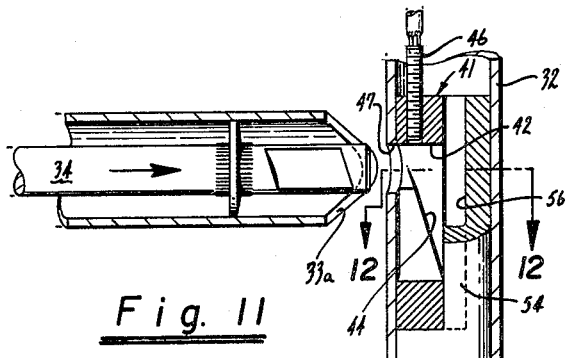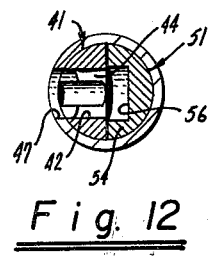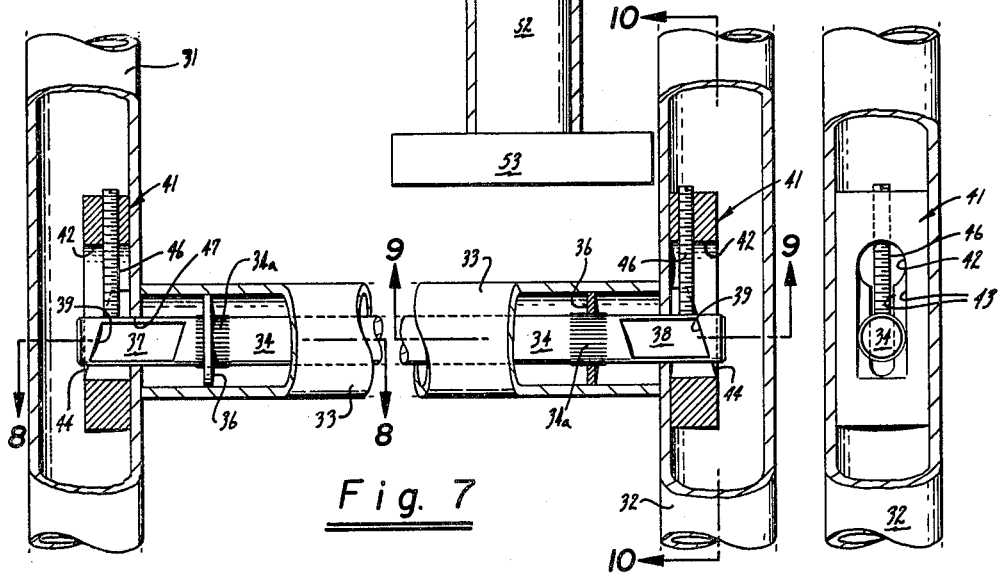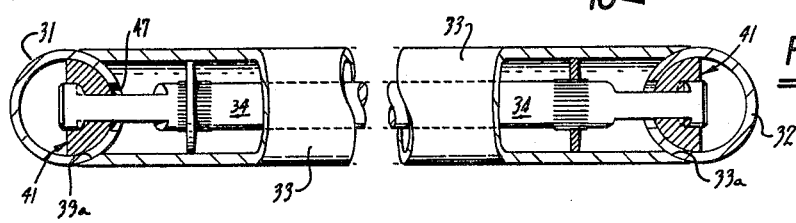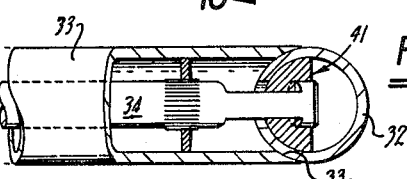

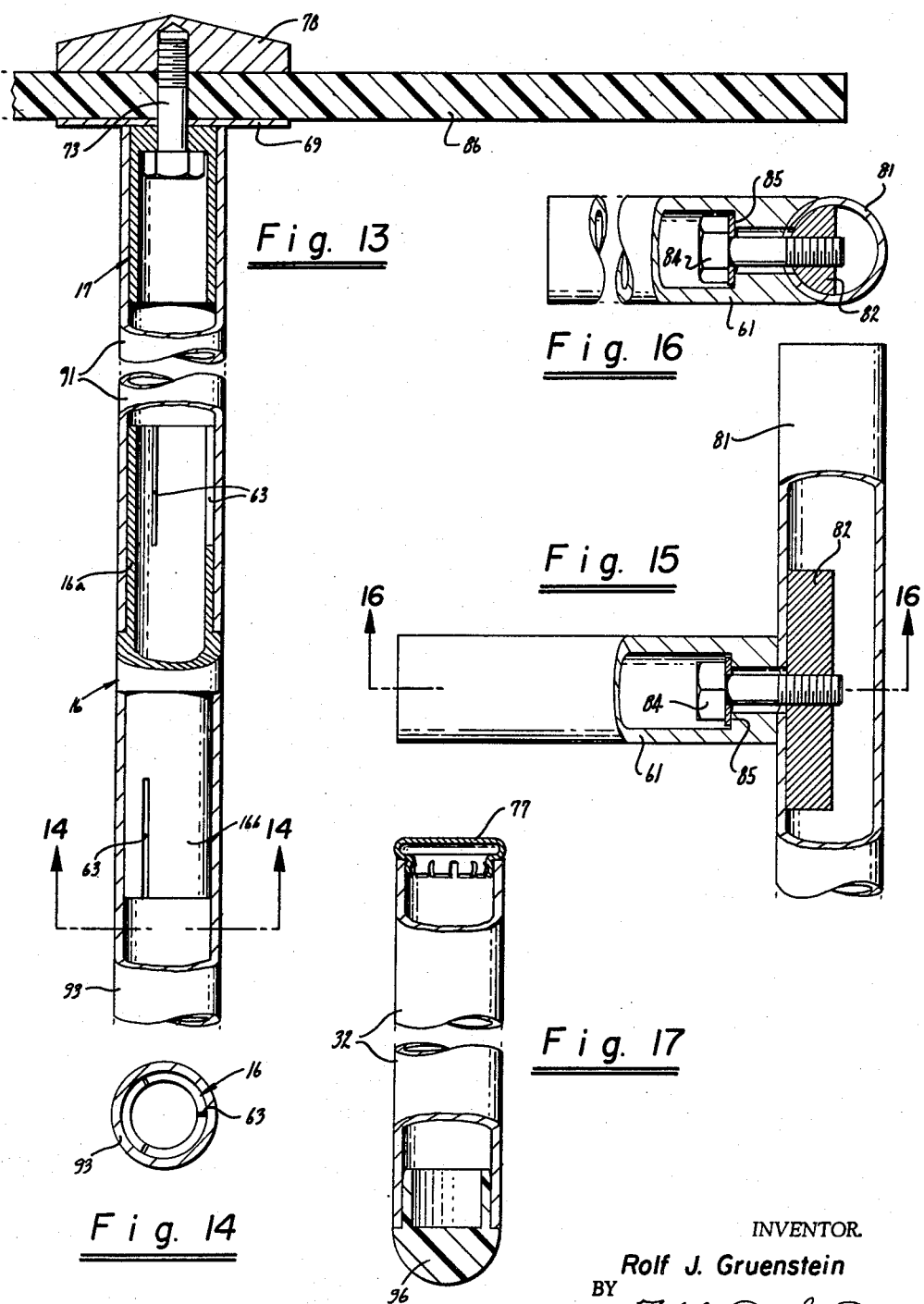

United States Patent Office

3,170,418
Patented Feb. 23, 1965

3,170,418
DISPLAY APPARATUS AND SYSTEM
Rolf J. Gruenstein, 1639 Lewiston Drive,
Sunnyvale, Calif.
Filed Aug. 9, 1963, Ser. No. 301,072
8 Claims. (Cl. 108—101)

This invention relates to a display apparatus and system and more particularly to a display apparatus and system particularly useful in retail stores for displaying merchandise and for many display applications in commerce and industry.

At the present time, many retail establishments fabricate their own individual display stands and assemblies for window displays and also for displays within the stores themselves. As is readily apparent, this involves the use of a considerable time-consuming labor with relatively large expenditures for labor and equipment by retail establishments. There is, therefore, a need for a display apparatus and system which can be assembled in many different ways to provide many different combinations of display apparatus and which will lend itself to many different types of display arrangements.

In general, it is an object of the present invention to provide a display apparatus and system which will overcome the above named disadvantages.

Another object of the invention is to provide a display apparatus and system of the above character which can be supplied in a multitude of kit forms containing different components and quantities thereof and which can be readily assembled and disassembled.

Another object of the invention is to provide a display apparatus and system of the above character which can be assembled into a great many different combinations or arrangements.

Another object of the invention is to provide a display apparatus and system of the above character which does not have exposed connections.

Another object of the invention is to provide a display apparatus and system of the above character which basically can be assembled and disassembled without tools.

Another object of the invention is to provide a display apparatus and system of the above character which has relatively great strength.

Another object of the invention is to provide a display apparatus and system of the above character which has a very attractive appearance.

Another object of the invention is to provide a display apparatus and system of the above character which has many unique construction features.

Additional objects and features of the invention will appear from the following description in which the preferred embodiments are set forth in detail in conjunction with the accompanying drawings.

Referring to the drawings:

FIGURE 5 is an isometric exploded view of a portion of a display apparatus showing particular construction features utilized in my display apparatus.

FIGURE 6 is an isometric view showing the parts shown in FIGURE 5 assembled into a unitary assembly.

FIGURE 7 is a front elevational view with parts broken away of an H-frame utilized in my display apparatus and incorporating unique construction features.

FIGURE 8 is a cross-sectional view taken along the line 8—8 of FIGURE 7.

FIGURE 9 is a cross-sectional view taken along the line 9—9 of FIGURE 7.

FIGURE 10 is a cross-sectional view taken along the line 10—10 of FIGURE 7.

FIGURE 11 is a cross-sectional view showing the method for assembling the H-frame.

FIGURE 12 is a cross-sectional view taken along the line 12—12 of FIGURE 11.

FIGURE 13 is a cross-sectional view of another portion of my display apparatus showing particular construction features with certain parts broken away.

FIGURE 14 is a cross-sectional view taken along the line 14—14 of FIGURE 13.

FIGURE 15 is still another portion of my display apparatus with certain parts broken away to show additional construction features.

FIGURE 16 is a cross-sectional view taken along the line 16—16 of FIGURE 15.

FIGURE 17 is a front elevational view of a portion of my apparatus showing additional construction features.

In general, my display apparatus and system consists of a plurality of support members which are fastened together into a unitary assembly. A plurality of display platforms are mounted upon the support members. At least one of the support members includes a pair of spaced parallel members and a cross member having its opposite ends secured to intermediate portions of the spaced parallel members. A particularly novel means is utilized for securing the opposite ends of the cross member to the spaced parallel members.

Figure 1:
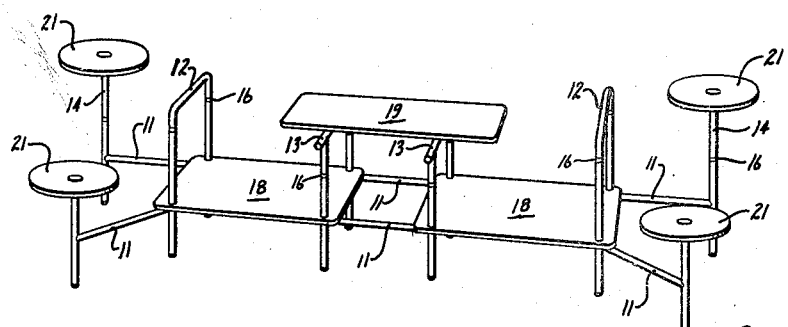
FIGURE 1 is a perspective view of one arrangement or combination of a great many possible arrangements of my display apparatus incorporating my invention.
Figure 3:
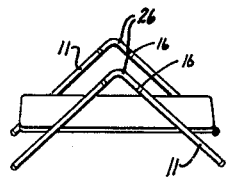

More in particular, as can be seen from FIGURES 1, 2, 3 and 4 which represent typical arrangements or combinations of display assemblies incorporating my apparatus and system, a plurality of common construction frame members are utilized. Thus, in FIGURE 1, six H-frame members 11, two U-frame members 12, two double T-frame members 13 and two full extension frame members 14 have been utilized. Full connectors 16 and half connectors 17 of a type hereinafter described are used for connecting the frame members. In addition, a plurality of different types of display platforms are utilized. Thus, as shown in FIGURE 1, a pair of display platforms 18, which are provided with holes so that they can be slipped over the posts of the H-frame members 11, are provided. In addition, a rectangular platform 19 is mounted on the top of the double T-frame members 13. Two platforms 21 in the rear are mounted upon the extensions 14, and two platforms 21 in the front are mounted directly upon the H-frame members 11 by suitable means hereinafter described.

Figure 2:
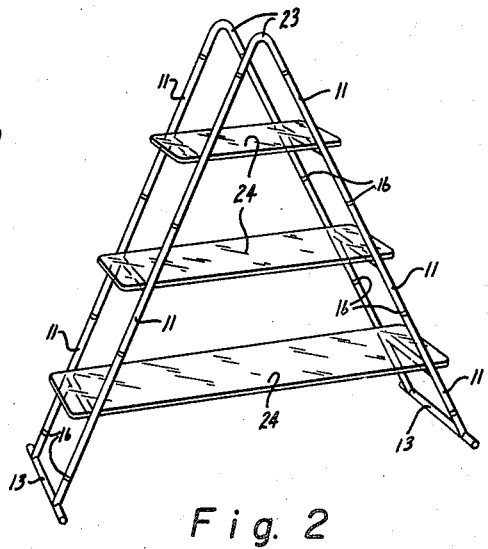

In the arrangement shown in FIGURE 2, six H-frame members 11, two double T-frame members 13 and a pair of angle frame members 23 are utilized. In addition, a plurality of rectangular platforms 24 of various lengths are mounted upon the H-frame members 11, as shown particularly in FIGURE 2.

Figure 18:
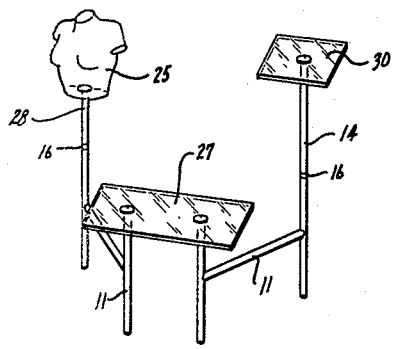
FIGURES 2, 3, 4 and 18 are perspective views and show additional arrangements or combinations of my display apparatus incorporating my invention.
Figure 4:
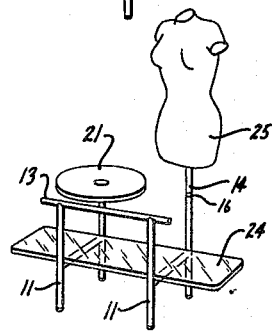

In the arrangement shown in FIGURE 4, a pair of H-frame members 11, double T-frame member 13 and extension 14 are utilized. Platforms 21 and 24, and a manikin 25 are also utilized. In the embodiment shown in FIGURE 3, a pair of H-frame members 11 and a pair of angle members 26 are provided. A platform 19 is mounted upon the H-frame members. In FIGURE 18, a pair of H-frame members 11 are fastened together with a rectangular platform 27. A half extension member 28 and a full extension member 14 are mounted upon the H-frame members 11 by full connectors 16. A manikin 25 and a square display platform 30 are mounted upon the extension members 28 and 29.

From these representative examples of display assemblies, it can be seen that my display apparatus and the system can be assembled into many different types of display apparatus, all of which have various aesthetic features and which particularly lend themselves for use in windows in department stores, displays within the store itself and for displays in other types of establishments. The basic components utilized in the assemblies are such that the apparatus can be formed into many different types of arrangements with great ease.

The particular construction feature utilized in the H-frame members 11 are shown particularly in FIGURES 7-10. As shown in these figures, each H-frame member consists of a pair of spaced parallel tubular members 31 and 32. The two members 31 and 32 are connected by a cross member or a connector tube 33 and a locking rod 34 which is disposed within the tubular cross member 33. As shown in FIGURE 7, the locking rod is cylindrical and is provided with knurled portions 34a upon which have been pressed positioning washers 36. These positioning washers are sized so that the rod 34 is positioned coaxially within the tubular cross member 33. Cut-outs 37 and 38 are provided on opposite ends of the lock rod 34 and form faces 39 which are inclined downwardly and towards the end of the rod as shown particularly in FIGURE 7.

A lock member 41 is disposed in the tubes 31 and 32 and, as shown particularly in FIGURES 8 and 9, this lock member is substantially semicylindrical in cross section. The lock members 41 are provided with holes 42 (FIGURE 10) which extend through the members equidistant from the sides and radially of the member. The lock members are also provided with elongated slots 43 which open into the holes 42. Spaced parallel inclined surfaces 44 (FIGURE 7) are formed in the lock members on opposite sides of the slots 43 and are adapted to cooperate with the inclined surfaces 39 (FIGURE 7) provided on the lock rod 34. The cut-outs 37 and 38 are of such depth so that the portion of the rod between the cut-outs can readily slip into the slots 43 provided in the lock members 41.

Means is provided for retaining the lock rod and the lock members in predetermined relationship and consists of Allenhead screws 46 which are threaded into the lock members 41 and which are adapted to engage the ends of the lock rod 34.

In order to facilitate assembly of the H-frame members, a jig post 51 (see FIGURE 11) is provided which consists of a vertical rod 52 which is affixed to a base 53. The rod 52 is provided with a semi-cylindrical cut-out 54 which is adapted to receive the lock member 41. The diameter of the cylindrical member 52 is such that it can readily fit within the hollow tubular members 31 and 32 of the H-frame member. In addition, the cylindrical member 52 is provided with a U-shaped recess 56 which is adapted to receive the end of the lock rod 34 during assembly.

In assembling an H-frame member, a lock member 41 is first placed upon the jig post 51. The screw 46 is retracted to the position shown in FIGURE 11. One of the tubes 31 or 32 is then placed upon the jig post 51 until it rests on the base 53. The tubular member mounted on the post is then rotated until the hole 47 is in registration with the hole 42 provided in the lock member.

After this has been accomplished, the locking bar 34 is placed through the hole 47 and into the hole 42 provided in the lock member. The lock bar rod 34 is positioned so that the surface 39 is inclined downwardly and outwardly so that when the lock rod is positioned within the recess 56, it can be moved downwardly so that the faces 39 engage the faces 44 provided on the lock member. As soon as this has been accomplished, a long wrench is utilized to turn the screw 46 to engage the end of the lock bar and move it downwardly for a slight distance so that it cannot accidentally became dislodged from the opening 47. Thereafter, the connector tube or cross tube 33 is placed over the lock rod and rotated so that its concave surface 33a mates with the vertical tube 32.

After this has been accomplished, another lock member 41 is positioned on another jig post and the other member 31 is positioned over the jig post in the same manner in which the member 32 was placed over the jig post. The lock member is then positioned to be inserted through the hole 47 and into the lock member 41 so that the surfaces 39 engage the surfaces 44 of the lock member. As soon as the lock rod engages the lock member, the Allenhead screw can be tightened to move the lock bar downwardly. Thereafter, the screws 46 are tightened by suitable means such as a torque wrench so that equal forces are applied to both ends of the lock bar 34 and so that the slack will be taken up evenly by both sides. As this tightening occurs, the cross member or connector member 33 will be urged into firm engagement with the vertical members 31 and 32. As soon as the screws have been sufficiently tightened, the members 31 and 32 and the cross member 33 with the lock bar 34 are formed into a rigid unitary assembly in which it is impossible from an exterior inspection to determine how each frame has been assembled into a unitary assembly. Absolutely smooth surfaces are formed at the juncture between the cross member 33 and the spaced parallel members 31 and 32.

Although the H-frame member can be readily assembled and disassembled, a rigid frame member is provided which can be utilized as a basic component in my display apparatus and system as can be seen in FIGURES 1-4.

In FIGURES 5 and 6, there is shown an assembly utilizing certain typical components which are commonly utilized in many arrangements of my display apparatus and system. Thus, as shown in FIGURE 5, the bottom portion of the lower H-member 11 is provided with mushroom-type bumpers 60 formed of a suitable material, such as rubber, which are disposed on the bottom extremities of the members 31 and 32. An extension member 61 is mounted on top of the lower H-frame member by means of a full connector 16 which has upper and lower portions 16a and 16b which are smaller in diameter and which are provided with slits 63. The diameters of the portions 16a and 16b are such that they can fit within the tubular members of H-frame members and other tubular members such as member 61. The other side of the H-frame member is secured to the underside of a plate or platform assembly 66 which requires the same spacing as the full connector 16 so that the extension member 65 will be properly positioned relative to the H-frame member 11. The assembly 66 consists of a plate 67 of suitable thickness of material such as plastic, metal or wood, which is to be used as a platform. The plate is provided with a hole 68. Washers 69 are mounted on opposite sides of the hole and half connectors 17 are mounted adjacent the washers 69. The half connectors have a diameter such that they can be slipped into the tubular members to provide a relatively tight friction fit. The connectors are provided with slits 72 in much the same manner as the full connector 16. The connectors are secured to the plate 67 by suitable means such as a bolt 73 disposed in one connector and extending through the hole 68 in the plate 67 into the other half connector. A nut 74 is threaded on the bolt 73 to tie the parts of the plate assembly 66 into a unitary assembly. After assembly, the plate assembly 66 can be mounted upon the H-frame member 11 by slipping the half connector into the upper portion of the H-frame. As hereinbefore pointed out, the vertical distance required for the assembly 66 is no greater than the connector 16 so that all parts of the display apparatus and system are always in horizontal alignment.

A circular platform 21 is mounted upon the extension member 65 by suitable means such as a half connector 17, a rosette or a washer 69 and a bolt 73 which extends upwardly through the half connector 17, the rosette or washer 69 and through the plate 21 and is threaded into a dome 78 which is provided with an attractive conical upper surface as shown.

A tubular member 81 is mounted on the extension member 61 to provide a single T. The connection between the members 61 and 81 is formed by a semi-cylindrical member 82 which is disposed within the member 81. A bolt 84 and a washer 85 are disposed in the member 61. The bolt 84 extends upwardly through the tube 81 and is threaded into the semi-cylindrical member 82 to firmly secure the extension 61 to the member 81 to provide a T-type connection as shown in detail in FIGURES 15 and 16.

A similar type of construction is shown in FIGURES 13–15. Thus, for example, a half connector 17 is secured to a large plate 86. A rosette or washer 69 is disposed between the half connector 17 and the plate 86. A bolt 73 is disposed within the half connector 17 and extends through the rosette 69, through the plate 86 and is threaded into the dome 78. The half connector 17 is mounted in an extension member 91. A full connector 16 is shown for connecting a tubular member 93, which may be part of an H-frame, to the extension member 91.

Details of means for closing the top and bottom portions of the members 32 of an H-frame section are shown in FIGURE 17. The lower portion of the member 32 which is adapted to rest upon the supporting surface is provided with a bumper 96. The upper extremity of the member 32 can be closed by suitable means such as a plug 77.

After the H-frame members and the T-frame members have been assembled, the frame members can be utilized in any number of ways and can be readily assembled by the utilization of half connectors and full connectors as shown in the drawings.

From the various construction features hereinbefore described, it can be seen how the various frame members utilized in the typical arrangements shown in FIGURES 1, 2, 3, 4 and 18 can be readily fabricated from a kit containing a plurality of such frame members. In addition, such a kit can contain angle frame members 23 and 26 to give greater versatility.

From examining the features pointed out above and the representative examples shown in FIGURES 1, 2, 3, 4 and 18, it can be seen that many other types of arrangements can be readily formed merely by the use of additional frame members or by rearrangement of the frame members. Thus, it can be seen that a store owner having a kit can readily fabricate different types of displays with very little difficulty. When not in use, the displays can be taken down and disassembled and stored in a very compact form in the kit until they are required for the next display.

It is also apparent from viewing the embodiments shown in FIGURES 1, 2, 3 and 4 that every effort has been made to make the display apparatus as attractive as possible. There are no external connections of fittings which are visible to the eye so that smooth, rounded, well finished surfaces are presented at all points. The use of different types and shapes of display platforms greatly adds to the aesthetic features of the display apparatus.

I claim:

1. In a display system, a plurality of frame parts, means removably securing the frame parts into a unitary assembly, a plurality of display platforms mounted upon the frame parts, at least one of the frame parts being in the form of an H-frame, the H-frame being comprised of a pair of spaced parallel tubular members, the tubular members having holes intermediate the ends thereof, a lock rod extending through the holes in the tubular member, a cross tubular member mounted coaxially on the lock rod and adapted to have its ends engage the spaced parallel members, and locking means disposed within the spaced parallel members and engaging the lock rod to lock the spaced parallel members and the cross member into a unitary rigid H-frame, said lock rod being provided with cut-out portions forming surfaces which are inclined with respect to the spaced parallel members, the locking means consisting of lock members, the lock members being formed with elongate slots having inclined faces on opposite sides of the slot and engaging the inclined surfaces of the lock rod and means mounted in the lock members and engaging the lock rod for retaining the lock members on the lock rod in a predetermined position to lock the lock rod into said first and second frame members.

2. A display system as in claim 1 together with an additional display platform and means for securing the additional display platform to a frame part, said last named means comprising a half connector removably mounted in the frame part, a rosette disposed between the display platform and the half connector, a bolt extending through the half connector, the rosette and through the platform, and a dome mounted on the opposite side of the platform, the bolt being threaded into the dome to retain the platform on the half connector.

3. A display system as in claim 1 together with an additional display platform and means for securing the display platform to the frame parts, said last named means consisting of a pair of half connectors removably mounted in the frame parts and disposed on opposite sides of the display platform, and means securing the half connectors to the display platform.

4. A display system as in claim 3 wherein the means securing the half connectors to the display platform consists of a bolt having its head disposed in one half connector and extending through the platform and into the other half connector, and a nut disposed in said other half connector and threaded on said bolt.

5. A display system as in claim 4 together with a rosette disposed between each half connector and the display platform.

6. In an H-frame for use in a display system, the H-frame comprising first and second spaced parallel tubular frame members, each of said frame members having a hole in an intermediate portion thereof, a tubular cross member extending between said first and second frame members and being in alignment with said holes, a lock rod disposed in said cross member and extending through the holes in said first and second frame members, and lock means disposed in said first and second frame members and engaging said lock rod to retain the ends of the lock rod within said first and second frame members and to join said first and second frame members and said cross member into a rigid unitary assembly, said lock rod being provided with cut-out portions forming surfaces which are inclined with respect to the spaced parallel frame members, the lock means consisting of lock members, the lock members being formed with elongate slots having inclined faces on opposite sides of the slot and engaging the inclined surfaces of the lock rod, and means mounted in the lock members and engaging the lock rod for retaining the lock members on the lock rod in a predetermined position to lock the lock rod into said first and second frame members.

7. An H-frame as in claim 6 together with means mounted in the cross member for positioning said lock rod in said cross member in a predetermined relation with respect to the cross member.

8. An H-frame as in claim 6 wherein said means mounted in said lock member and engaging said lock rod consists of screws threaded into the lock members and wherein said first and second frame members are open on at least one end to permit access to the screws.

(References on following page)

References Cited by the Examiner

UNITED STATES PATENTS

| | | | |
|---|---|---|---|
| 115,456 | 5/71 | Fisher | 108—101 |
| 162,039 | 4/75 | Deetz | 5—299 |
| 971,371 | 9/10 | Hale | 211—148 |
| 1,061,487 | 5/13 | Moore | 5—283 |
| 1,401,057 | 12/21 | Elliott | 211—182 |
| 1,431,823 | 10/22 | Leconte | 211—182 |
| 1,675,827 | 7/28 | Shrader | 108—156 |
| 1,844,040 | 2/32 | Lawrenz | 108—150 |
| 1,932,794 | 10/33 | McArthur | 211—148 |
| 2,443,684 | 6/48 | Lazarus | 211—148 |
| 2,557,766 | 6/51 | Ronfeldt | 287—54 |
| 2,937,062 | 5/60 | Kruse | 108—157 |
| 2,972,495 | 2/61 | Yalon | 287—54 |
| 3,071,399 | 1/63 | Cronin | 287—54 |

FOREIGN PATENTS

| | | |
|---|---|---|
| 931,996 | 11/47 | France. |
| 967,820 | 4/50 | France. |
| 1,152,416 | 9/57 | France. |
| 1,191,382 | 4/59 | France. |
| 895,142 | 5/62 | Great Britain. |

FRANK B. SHERRY, *Primary Examiner.*